(12) United States Patent
Whelan

(10) Patent No.: US 7,849,789 B1
(45) Date of Patent: Dec. 14, 2010

(54) ADJUSTABLE PORTABLE CUTTING BOARD AND METHOD OF USE THEREOF

(76) Inventor: Michael Whelan, 719 W. Spur Ave., Gilbert, AZ (US) 85233

( * ) Notice: Subject to any disclaimer, the term of this patent is extended or adjusted under 35 U.S.C. 154(b) by 412 days.

(21) Appl. No.: 11/781,839

(22) Filed: Jul. 23, 2007

Related U.S. Application Data

(63) Continuation-in-part of application No. 11/286,074, filed on Nov. 23, 2005.

(51) Int. Cl.
  *A23N 4/04* (2006.01)
  *A47B 85/00* (2006.01)
  *A47B 3/00* (2006.01)
  *A47B 3/02* (2006.01)
  *A47B 3/06* (2006.01)
  *A47B 47/00* (2006.01)
  *A47B 3/12* (2006.01)
  *A47B 3/83* (2006.01)

(52) U.S. Cl. .............................. 99/537; 108/12; 108/39; 108/116; 108/130; 108/131; 108/159; 108/174

(58) Field of Classification Search .................... 99/537; D7/698; 108/26, 12, 42, 39, 54.1, 174, 116, 108/130, 131, 146, 159, 132, 133
See application file for complete search history.

(56) References Cited

U.S. PATENT DOCUMENTS

| | | | |
|---|---|---|---|
| 1,623,100 A | 4/1927 | Dolan | |
| 1,959,950 A | 5/1934 | Frielander | |
| D140,595 S | 3/1945 | Browne et al. | |
| 2,652,300 A | 9/1953 | Graber et al. | |
| 3,805,711 A | 4/1974 | Lakso | |
| 3,926,419 A | 12/1975 | Kenny | |
| D244,899 S | 7/1977 | Brandenfels | |
| 4,064,812 A | 12/1977 | Commanda | |
| 4,296,694 A * | 10/1981 | Kobayashi | 108/116 |
| 4,526,346 A * | 7/1985 | Galloway et al. | 254/122 |
| 5,572,934 A | 11/1996 | Aldridge et al. | |
| D382,775 S | 8/1997 | Skerker et al. | |
| 5,860,367 A | 1/1999 | Riegel et al. | |
| 6,371,470 B1 | 4/2002 | Ward | |
| D464,237 S | 10/2002 | Kaposi | |
| 6,581,774 B1 | 6/2003 | Galafassi et al. | |
| 6,745,702 B2 | 6/2004 | Goldberg et al. | |
| 2002/0096092 A1 | 7/2002 | Simonson | |

* cited by examiner

*Primary Examiner*—Tu B Hoang
*Assistant Examiner*—Lindsey C Teaters
(74) *Attorney, Agent, or Firm*—Schmeiser, Olsen & Watts LLP

(57) ABSTRACT

An adjustable portable cutting board has a cutting surface and at least two adjustable legs. The adjustable legs are coupled to a bottom side of the cutting surface and may adjust in length, wherein the legs include a locking device to lock the legs at a desired length. The legs are also pivotable between an opened position and a closed position, wherein the opened position allows the cutting board legs to be placed on a work surface and elevate the cutting surface to the desired height and the closed position rotates the legs into a position substantially parallel with the cutting surface for transporting. The cutting board also includes a handle for carrying the cutting board. The cutting board is completely submersible in water or other liquids and the legs also include a drain aperture for draining any water and drying any moisture that enters within the legs.

12 Claims, 9 Drawing Sheets

ADJUSTABLE PORTABLE CUTTING BOARD AND METHOD OF USE THEREOF

CROSS REFERENCE TO RELATED APPLICATION

This application is a continuation-in-part of the earlier U.S. Utility Patent Application to Michael Whelan entitled "ADJUSTABLE PORTABLE CUTTING BOARD AND METHOD OF USE THEREOF," Ser. No. 11/286,074, filed Nov. 23, 2005, now pending, the disclosure of which is hereby incorporated entirely herein by reference.

BACKGROUND OF THE INVENTION

1. Technical Field

This invention relates generally to cutting boards and more particularly to portable cutting boards.

2. State of the Art

Food preparation often requires the need to cut or slice the food prior to cooking it, such as meat, including, chicken, beef, pork, fish and all other types of meat. Additionally, other food types do not require cutting prior to cooking, or may not need any cooking at all, such as fruits, melons, vegetables or any other food type that does not require cutting or slicing prior to cooking or requires no cooking in its preparation. Cutting boards are often used for these types of cutting and slicing, for among other reasons, to protect the counter top from being marred, scratched or cut by the cutting utensil.

Conventional cutting boards are typically a planar substrate that rests on the counter top. The cutting board has a surface upon which the food items are placed and then cut using a cutting utensil, such as a knife, a cleaver or other utensil. These conventional cutting boards provide a surface upon which to cut without damaging the table, but are lacking in one particular aspect. The cutting board is limited to the height of the counter upon which it rests and often causes back pain to the user. The user, particularly chefs or other cooks that prepare food for long periods of time and on a daily basis, suffer from back pain and may have further back trauma requiring medical treatment due to leaning over to use conventional cutting boards.

Attempts to solve this problem have resulted in conventional cutting boards with legs. These legs raise the height of the cutting surface in attempts to alleviate the back problems of the user. However, these conventional cutting boards with legs are also problematic. Particularly, the conventional cutting boards lack the ability to be properly sanitized as a whole unit. As these cutting boards are used, they will inevitably come into contact with raw meats. The raw meats come in contact not just with the cutting surface, but also the legs and other surfaces of the cutting board. Conventional cutting boards do not provide a way for submersing the cutting boards into water to sanitize properly all components of the cutting boards.

Accordingly, there is a need in the field of cutting boards for an improved cutting board with adjustable height.

DISCLOSURE OF THE INVENTION

The present invention relates to an adjustable portable cutting board that can vary the height of a cutting surface, while enabling all components to be properly sanitized.

An aspect of the present invention includes an adjustable cutting board comprising a cutting board and an adjustable frame coupled to the cutting board for adjusting the height of the cutting board. The adjustable frame comprises a base, a cutting board receiver for removably securing the cutting board into the frame and at least two scissor legs. Each scissor leg may have two portions rotatably coupled together, wherein the scissors legs are coupled between the base and the cutting board receiver.

Another aspect of the present invention includes an adjustable cutting board frame for receiving and retaining a cutting board, the frame comprising a base, a cutting board receiver for removably securing the cutting board into the frame and two scissor legs. Each leg has a first and second portion rotatably coupled together. A first end of the first portion may be rotatably coupled to the cutting board receiver and a second end of the first portion may be slidably coupled to the base. Further, a first end of the second portion may be rotatably coupled to the base and a second end of the second portion may be slidably coupled to the cutting board receiver.

Further still, another aspect of the present invention includes a method of using an adjustable cutting board, the method comprising securing a cutting board within an adjustable cutting board frame; placing a base of the adjustable cutting board frame on a working surface; raising the cutting board from a closed position to a desired height; automatically locking the adjustable cutting board at the desired height; and preparing food using the cutting board surface.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to an adjustable portable cutting board that can vary the height of a cutting surface, while enabling all components to be properly sanitized. Generally, embodiments of adjustable portable cutting boards of the present invention include a cutting surface and at least two legs coupled to the cutting surface. Other general embodiments of an adjustable cutting board include a cutting board and an adjustable frame having scissor legs.

Figure 1:
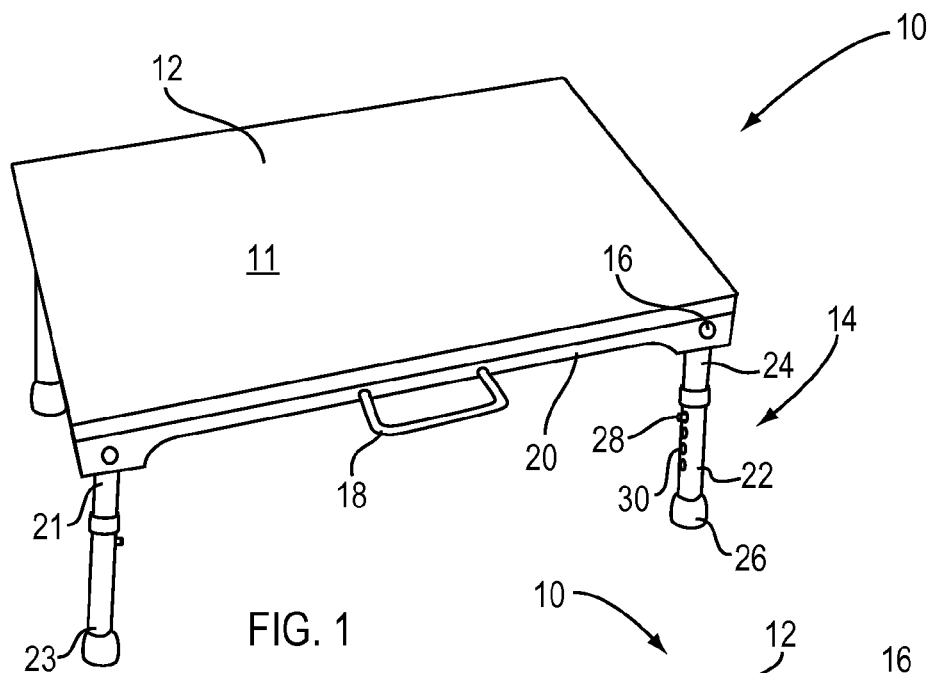
FIG. 1 is a perspective view of an adjustable portable cutting board, in accordance with the present invention.

As shown in FIG. 1, particular embodiments of the present invention include an adjustable portable cutting board 10. The cutting board 10 comprises a cutting surface 12 having an upper side 11 and a bottom side 13, legs 14 having a first end 21 and a second end 23, a handle 18 and a leg bracket 20 coupled to the bottom side 13 of the cutting surface 12. The first end 21 of the legs 14 are coupled to the leg bracket 20 by use of pivot point 16. The legs 14 may comprise an outer portion 22 and an inner portion 24, wherein the inner portion 24 is configured to be slideably securable to the outer portion 22 such as, but not limited to a telescopic fit between the outer portion 22 and the inner portion 24. The outer portion 22 may comprise adjusting apertures 30. Further a foot 26 may be coupled to the second end 23 of each leg 14, wherein the foot 26 is formed of a slip resistant material. The leg 14 may also comprise a locking device 28, wherein the locking device 28 is configured to engage an adjusting aperture 30 in order to lock the leg 14 in at a particular length, with the outer portion 22 telescopically extending a particular length from the inner portion 24. Particular embodiments of the present invention may further comprise a utensil retainer 15 coupled to the cutting surface 12 as shown in FIG. 2.

Figure 2:
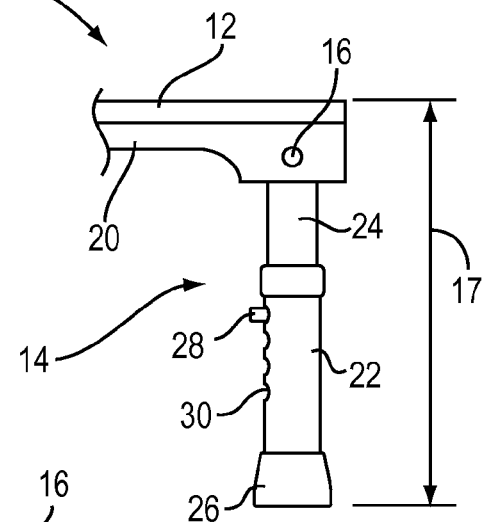
FIG. 2 is a front view of a portion of an adjustable cutting board with a leg in an open position, in accordance with the present invention.
Figure 3:
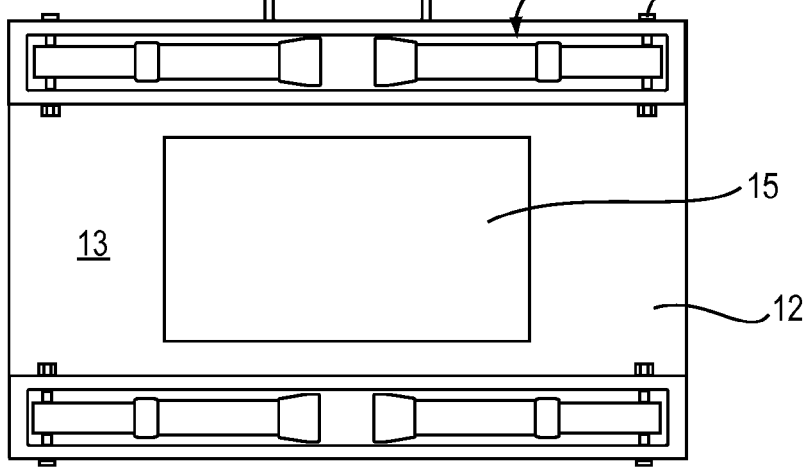
FIG. 3 is a bottom view of an adjustable portable cutting board with legs in a closed position, in accordance with the present invention.

Referring to FIG. 1 and with further reference to FIGS. 2 and 3, the legs 14 may be at least two pivotably adjustable legs 14 and are pivotable between a closed position and a opened position, wherein the legs 14 in the closed position are substantially parallel with the cutting surface 12 and the legs 14 in the opened position extend down and away from the cutting surface 12. The legs 14 are pivotable using pivot point 16. The legs 14 are also adjustable in length to vary the height of the cutting surface 12, the legs 14 including a locking device 28 for releasably locking the legs 14 at a particular length. When the legs 14 are locked at a particular length and in the opened position, the cutting board 10 may be placed on a counter top or other work surface, thereby elevating the cutting surface 12 to a desired height. This enables the user to have access to and use the cutting surface 12 without having to lean over, thereby alleviating the pain, discomfort and other problems suffered by the back of the user. It will be understood that the cutting board 10 may extend to a height 17, wherein the top surface 11 is approximately 1.5 feet above the surface upon which the cutting board 10 is resting on when the legs 14 are fully extended, as shown in FIG. 2. The foot 26 of each leg 14 may be a slip resistant material to allow the cutting board 10 to be used while reducing the slipping of the cutting board 10. The foot 26 of each leg 14 further protects the counter top from being damaged by the legs 14.

The legs 14 when in the closed position are rotated toward the bottom side of the cutting surface 12. The legs 14 may have to be set and locked at a shorter length so as to not interfere with another leg 14 when in the closed position. Once the legs 14 are pivoted into the closed position, a user may carry the cutting board 10 using the handle 18. This provides an easier manner of portability of the cutting board 10.

It will be understood by those of ordinary skill in the art that the legs 14 are not limited to adjustability by the use of telescopic legs, but may be adjustable in other manners including, but limited to, folding leg portions and in particular embodiments providing a plurality of sets of legs, wherein each set of legs of the plurality of sets of legs are various lengths thereby allowing the height of the cutting surface to be adjusted dependent upon which set of legs are used. Further, the locking device 28 may be any type of locking device such as a spring loaded shaft, a locking pin, a fastener, a bar, a bolt, a catch, a clamp, a clasp, a hook and a latch. The foot 26 may be formed of any type of slip resistant material, such as, but not limited to rubber and plastic. Additionally, the pivot point 16 may be any type of component that allows pivoting of the leg 14, such as, but not limited to, a bolt, a shaft, a pin, a rod, a peg, a pipe and a rivet. Also, the handle 18 may be coupled to the cutting surface 12 or may be integral with the cutting surface 12, and may further be located on any side of the cutting surface, so long as the handle may be used to transport the cutting board 10.

Figure 4:
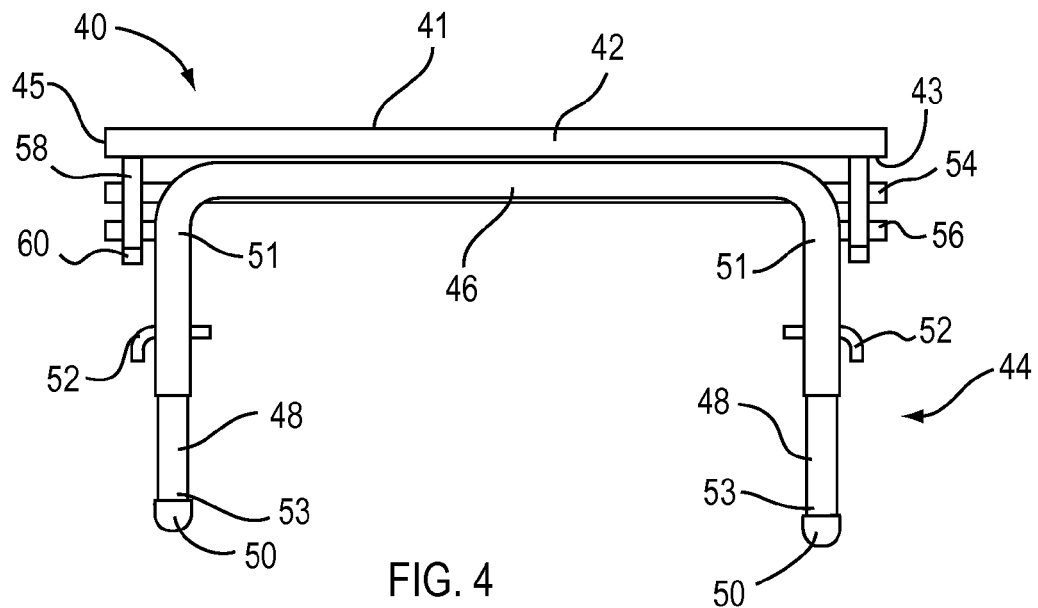
FIG. 4 is a side view of an adjustable portable cutting board, in accordance with the present invention.

Further referring to the drawings, FIGS. 4-7 depict a particular embodiment of an adjustable portable cutting board 40 in accordance with the present invention. As seen in FIG. 4, the cutting board 40 comprises a cutting surface 42 having a top side 41 and a bottom side 43, U-shaped legs 44 having a first end 51 and a second end 53, pivot points 56, stop rod 54 and leg bracket 58. The leg bracket 58 is coupled to the bottom side 43 of the cutting surface 42. The first end 51 of the legs 44 are coupled to the cutting surface 12 by coupling the first end 51 to the leg bracket 58 using the pivot points 56. The legs 44 may comprise an outer portion 46 and two inner portions 48, wherein the outer portion 46 is U-shaped with opposing ends each configured to telescopically receive an inner portion 48. The leg 44 may further comprise a foot 50 coupled to the second end 53 of the legs 44, wherein the foot 50 is formed of a slip resistant material. In particular embodiments, the foot 50 is coupled to each inner portion 48, wherein each inner portion may comprise the second end 53 of the leg 44. Further, the leg 44 may comprise two locking devices 52 to lock each inner portion 48 at an equal particular length to provide the desired height of the cutting surface 42. It will be understood that the cutting board 40 may extend to a height, wherein the top surface 41 is approximately 1.5 feet above the surface upon which the cutting board 40 is resting on when the legs 44 are fully extended. Additionally, the cutting board 40 may further comprise overhang 45, wherein the over hang 45 is configured to extend further than the components coupled to the bottom side 43 and that extend below the cutting surface 42. This overhang 45 reduces the ability of liquid from food products, such as, but not limited to raw meat, to contact other components of the cutting board 40, thereby reducing the opportunity for contamination of the other components.

Figure 6:
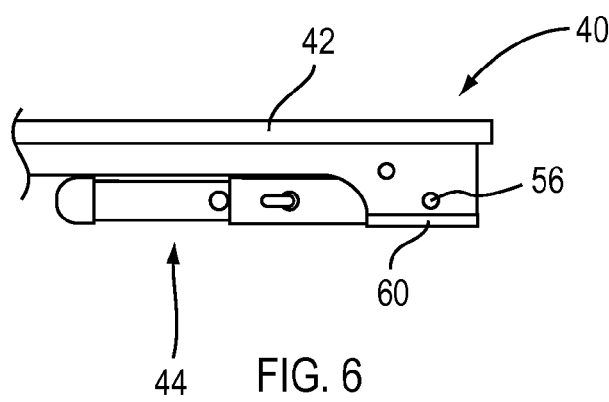
FIG. 6 is a front view of a portion of the cutting board of FIG. 4 with a leg in a closed position, in accordance with the present invention.
Figure 5:
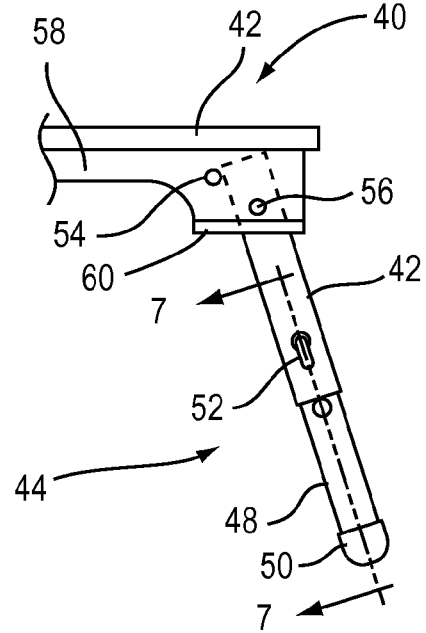
FIG. 5 is a front view of a portion of the cutting board of FIG. 4 with a leg in an opened position, in accordance with the present invention.

FIGS. 5 and 6 depict a front view of a portion of the cutting board 10 showing one of at least two adjustable legs 44, wherein the at least two adjustable legs 44 are pivotable between a closed position and a opened position, wherein the legs 44 in the closed position are substantially parallel with the cutting surface 42 and the legs 44 in the opened position extend down and away from the cutting surface 42. Further, the legs 44 are adjustable in length to vary the height of the cutting surface 42, the legs 44 including a locking device 52 for releasably locking the legs 44 at a particular length. The locking device 52 as shown for the exemplary purposes of this disclosure, and not as a limitation, is a locking pin. The outer portion 46 comprises an outer lock aperture 62 that extends through the outer portion 46 and the inner portion 48 comprises a plurality of inner lock apertures 64 that extend through the inner portion 48. The outer lock aperture 62 and the plurality of inner lock apertures 64 are configured such that the outer lock aperture 62 may be aligned with one inner lock aperture 64 at a time. When the outer lock aperture 62 is aligned with one inner lock aperture 62 the locking device 52 may be inserted through both apertures 62 and 64 to lock the leg 44 at a particular length.

Once the leg 44 is set to the desired length, it may be pivoted into the opened position. The stop rod 54 may provide a stopping point for the legs 44 pivot revolution. The stop rod 54 prevents the leg 44 from rotating past a predetermined angle while allowing the legs to provide sufficient support of the cutting surface 42 when in use.

The legs 44 may be pivoted using pivot point 56 into a closed position as shown in FIG. 6, wherein the legs 44 are substantially parallel to the cutting surface 42. In this configuration, the cutting board may be transported. Additionally, other particular embodiments of the present invention may include a cutting board 40 that comprises a rest 60 coupled to at least one of the bottom side of the cutting surface 42 and the bracket support 58. When the legs are rotated into the closed position, the cutting board may be used by placing the rests 60 onto the work surface. The rests 60 would then provide the lowest height setting for use of the cutting board 40.

Figure 7:
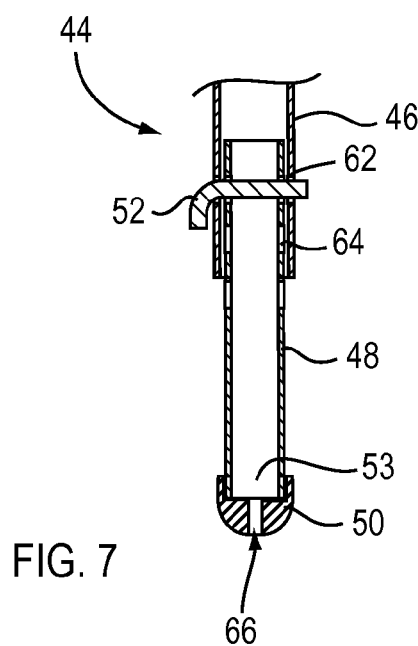
FIG. 7 is a section view of a leg of the cutting board of FIG. 5 taken along line 7-7.

Referring now to FIG. 7, particular embodiments of the present invention include a leg 44 further comprising a drain aperture 66 located on an end of the second end 53 of the leg, wherein the drain aperture 66 prevents moisture retention within the legs 44. The drain aperture 66 may extend through the foot 50 of the leg 44 and allows the drainage of water and other liquids from within the leg 44, such that liquids within the outer portion 46 and the inner portion 48 are drained through the drain aperture 66. In particular embodiments of the present invention, the draining of liquids may be accomplished more effectively by setting the cutting board 40 up in a useable position with the drain aperture 66 down and letting the liquid flow gravitationally through the drain aperture 66 and out of the legs 44. Additionally, while particular embodiments comprise outer lock aperture 62 and inner lock aperture 64 configured to receive lock device 52, these apertures may not drain all water or moisture from within the legs 44. The drain aperture 66 ensures that a substantial amount of moisture is drained from within the legs 44 and further allows for evaporation of moisture not drained.

Particular embodiments of the present invention may include an adjustable portable cutting board comprising a cutting surface that may be high impact, non-porous and lightweight. A high impact cutting surface may be able to withstand high impacts from utensils such as, but not limited to a meat tenderizing mallet, a cutting knife, a cleaver and any other type of utensil that may be used to exert a high impact on the preparation of food products. A non-porous cutting surface may be formed of a unitary planar substrate wherein a top side of the cutting surface may be flat, continuous and unitary, thereby preventing the retention of and further breeding of bacteria within the pores of the cutting surface to inhibit the contamination of the cutting surface. A light weight cutting board allows for easy portability making it easier for a user to carry and transport the cutting board. For the exemplary purposes of this disclosure, the cutting surface may be formed of a polypropylene which is high impact, non-porous and lightweight. It will be understood that the cutting surface may not be limited to polypropylene, but may be formed of other materials such as polyethylene, polyurethane, nylon or other material so long as it is high impact, non-porous and lightweight. Also, the cutting surface may comprise a honeycomb construction on a bottom side of the cutting surface to provide strength, while reducing the amount of material used to provide a lightweight surface.

Additionally, particular embodiments of the present invention include an adjustable portable cutting board comprising a cutting surface that may be a planeable surface. A planeable surface is a surface that may be planed by removing a top most layer of the cutting surface so as to eliminate any mars, grooves, indentation and other surface deformations. This allows for the top side of the cutting surface to be reformed into a non-porous surface to resist bacteria development. Mars, grooves and indentations caused by the use of knives, cleavers, mallets and other utensils are locations on the cutting surface in which bacteria formation is more prevalent and likely, even after cleaning the surface. The ability to plane the surface inhibits the formation of bacteria by removing the surface imperfections.

Further, particular embodiments of the present invention include an adjustable portable cutting board that may be weight bearing. The cutting board when in use may be able to support weights up to approximately 120 pounds. This allows for a variety of food products that may be prepared on the cutting surface. Particularly this allows for heavier products to be prepared or cut, such as, by hunters who need to portion the game they have successfully hunted.

It will be understood that the adjustable portable cutting board in accordance with the present invention is resistant to moisture. This enables the cutting board to be fully submersed in water or other cleaning/sanitizing chemical for cleaning and sanitizing all components of the cutting board. The U.S. Food and Drug Administration Food Code has been established for the purpose of safeguarding public health and providing to consumers food that is safe, unadulterated, and honestly presented. In particular, there are specific criteria that must be followed when cleaning and sanitizing equipment used in food preparation. According to Section 4-602.11 (A) of the Food Code, equipment shall be cleaned (1) before use with a different type of raw animal food such as beef, fish, lamb, pork, or poultry; (2) Each time there is a change from working with raw foods to working with ready-to-eat foods; (3) Between uses with raw fruits and vegetables and with potentially hazardous food (time/temperature control for safety food); (4) Before using or storing a food temperature measuring device; and (5) At any time during the operation when contamination may have occurred.

Further according to Section 4-603.14 of the Food Code, wet cleaning may accomplished accordingly: (A) Equipment food-contact surfaces and utensils shall be effectively washed to remove or completely loosen soils by using the manual or mechanical means necessary such as the application of detergents containing wetting agents and emulsifiers; acid, alkaline, or abrasive cleaners; hot water; brushes; scouring pads; high-pressure sprays; or ultrasonic devices; and (B) The washing procedures selected shall be based on the type and purpose of the equipment or utensil, and on the type of soil to be removed.

Additionally, after cleaning and before further use, the equipment must be sanitized. Section 4-703.11 describes ways of sanitizing, which include, (A) Hot water manual operations by immersion for at least 30 seconds and as specified under §4-501.111; (B) Hot water mechanical operations by being cycled through equipment that is set up as specified under §§4-501.15, 4-501.112, and 4-501.113 and achieving a utensil surface temperature of 71° C. (160° F.) as measured by an irreversible registering temperature indicator; or (C) Chemical manual or mechanical operations, including the application of SANITIZING chemicals by immersion, manual swabbing, brushing, or pressure spraying methods, using a solution as specified under §4-501.114 by providing: (1) Except as specified under Subparagraph (C)(2) of this section, an exposure time of at least 10 seconds for a chlorine solution specified under ¶4-501.114(A), (2) An exposure time of at least 7 seconds for a chlorine solution of 50 MG/L that has a PH of 10 or less and a temperature of at least 38° C. (100° F.) or a PH of 8 or less and a temperature of at least 24° C. (75° F.), (3) An exposure time of at least 30 seconds for other chemical SANITIZING solutions, or (4) An exposure time used in relationship with a combination of temperature, concentration, and PH that, when evaluated for efficacy, yields SANITIZATION as defined in Subparagraph 1-201.10 (B).

According to the Food Code all equipment that is used in food preparation has to be cleaned and sanitized in order to comply with the code. It becomes particularly important when using a portable cutting board. The cutting surface of the cutting board according to particular embodiments of the present invention is not the only surface to contact food, particularly raw meat. The legs and handle may also come in contact with raw meat and other food and may thereby cross-contaminate other food, such as, but not limited to, the passing on of e-coli and salmonella. It becomes necessary to enable the cleaning of all parts of the adjustable portable cutting board as well as sanitization of all parts. This is only available if all components of the adjustable portable cutting board are moisture resistant. This provides for the ability to perform a wet wash, rinse and even a hot water or chemical sanitization of the cutting board easily without damaging affects on the cutting board components. Additionally, the adjustable legs may be corrosion resistant to avoid other mechanical failure when wet or subjected to washing with water or a chemical. Particular embodiments of the present invention may include components that are resistant to discoloration and other negative effects that may be induced by a chemical sanitization process. This allows for the integrity of the cutting board to be maintained through use, cleaning and sanitizing of the cutting board.

Figure 8:
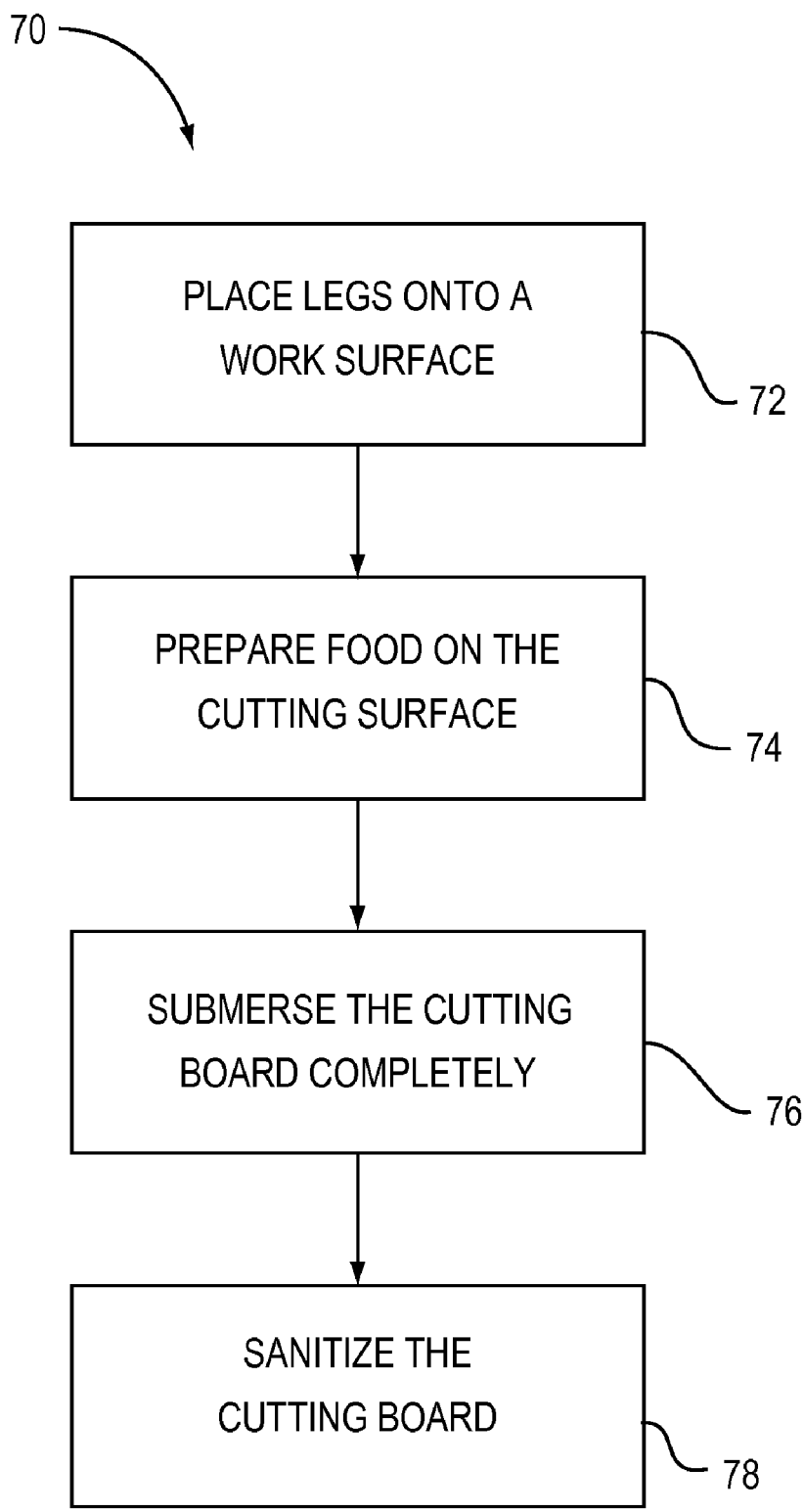
FIG. 8 is a flow chart of a method of use of an adjustable portable cutting board, in accordance with the present invention.

As shown in FIG. 8, another particular embodiment of the present invention includes a method of using and cleaning an adjustable portable cutting board 70. The method 70 may be accomplished through the steps to place the legs onto a work surface with a cutting surface of the cutting board facing up (Step 72), prepare food on the cutting surface (Step 74), submerse the cutting board completely in water (Step 76) and sanitize the cutting board (step 78). Step 72 may further comprise the steps of extending the legs to a desired length and locking the legs at the desired length. Step 74 may further comprise the step of cutting at least one of raw meat, fruit, vegetables and ready-to-eat food. Further, Step 76 of method 70 comprises the step of cleaning the cutting board, wherein cleaning the cutting board further comprises the steps of rinsing the cutting board and draining excess water from within the legs. Additionally, Step 78 may further comprise the steps of submersing the cutting board into at least one of hot water, sanitizing chemical and any combination thereof and draining any excess hot water, sanitizing chemical and any combination thereof from within the legs.

Figure 9A:
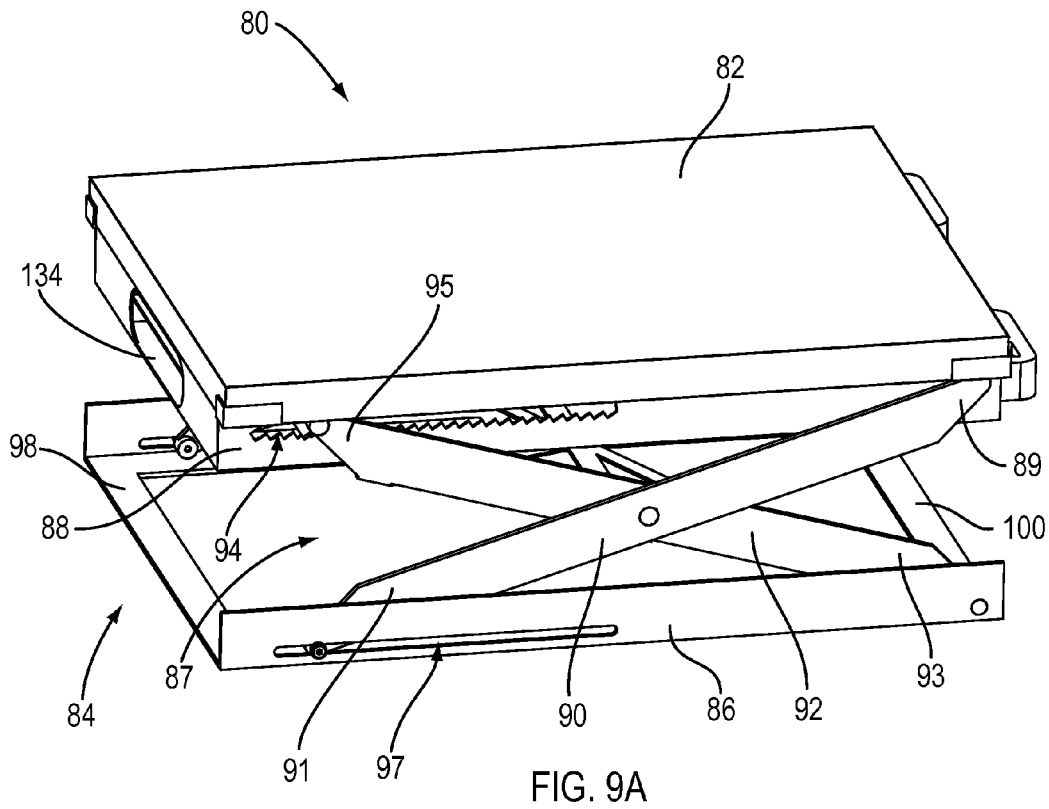
FIGS. 9A and 9B are perspective views of an adjustable cutting board with scissor legs in accordance with embodiments of the present invention.
Figure 9B:
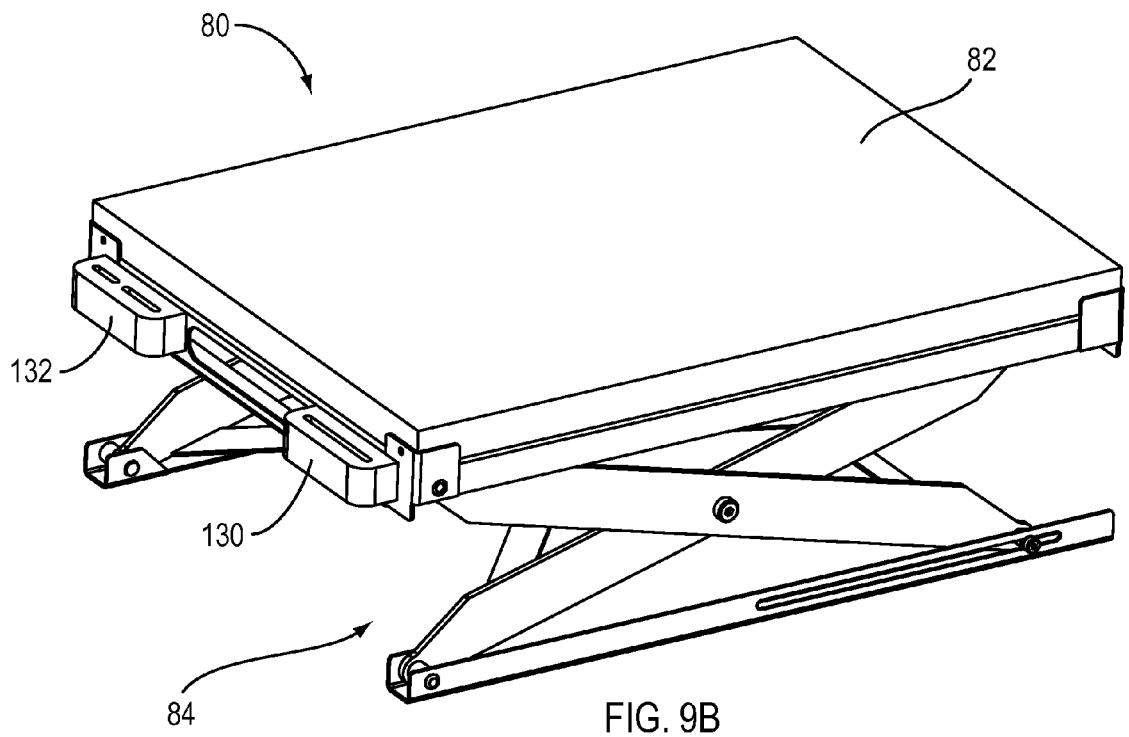

Referring again to the drawings, FIGS. 9A and 9B depict an adjustable cutting board 80 according to particular embodiments of the present invention. The adjustable cutting board 80 includes a cutting board 82 and an adjustable frame 84. The adjustable frame 84 includes a base 86, a cutting board receiver 88 and at least two scissor legs 87. The scissor legs 87 are coupled between the base 86 and the cutting board receiver 88, therein the at least two scissor legs may be coupled on opposing sides of the base 86 and the cutting board receiver 88.

The scissor legs 87 may each have a first portion 90 and a second portion 92 rotatably coupled together. A first end 89 of the first portion 90 is rotatably coupled to the cutting board receiver 88 and a second end 91 of the first portion 90 is slidably coupled to the base 86. A first end 93 of the second portion 92 is rotatably coupled to the base 86 and a second end 95 of the second portion 92 is slidably coupled to the cutting board receiver 88.

The base 86 has at least two apertures 97, each aperture 97 configured to couple to the second end 91 of the first portion 90 of a scissor leg 87, wherein the aperture 97 has a length that defines the range of heights the frame 84 is adjustable between. Additionally, the cutting board receiver 88 has two apertures 94 corresponding to the two apertures 97 of the base 86, wherein each aperture 94 of the cutting board receiver 88 is configured to couple to the second end 95 of the second portion 92 of a scissor leg 87, wherein the aperture 94 has a length that defines the range of heights the frame 84 is adjustable between. Further, the base 86 may have at least two supports 98 and 100 coupled between each side or track portion of the base 86. The supports 98 and 100 provide additional support to the frame 84 in supporting the weight applied from using the cutting board 80 in the preparation of food.

Further, the adjustable cutting board 80 may include utensil holders 130 and 132, wherein utensils such as various cutting utensils may be stored during use of the adjustable cutting board 80. Additionally, the cutting board may include a handle 134 for transporting the adjustable cutting board 80. It will be understood that the adjustable cutting board 80 may be put into a closed position wherein the base 86 is in contact with the cutting board receiver 88. This allows for portability of the board and further is the lowest height setting of the adjustable cutting board 80.

Figure 14:
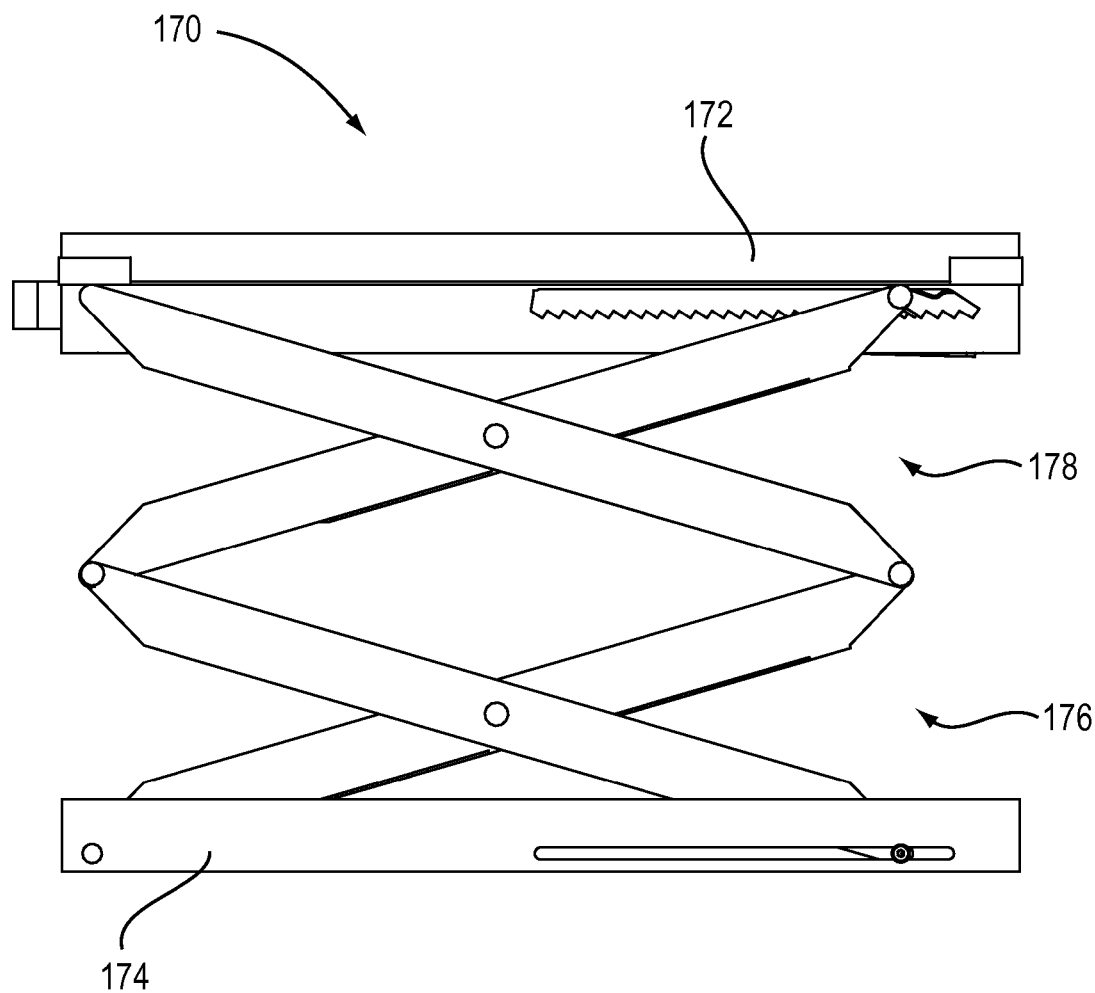
FIG. 14 is a side view of an adjustable cutting board with a plurality of scissor legs in accordance with the present invention.

It will be understood that particular embodiments, as shown in FIG. 14, may include an adjustable cutting board 170 having a cutting board 172, a base 174 and a plurality of scissor legs 176 and 178. It will be understood that the adjustable cutting board may use the plurality of scissor legs 176 and 178 in order to adjust the cutting board 172 to a greater height, while maintaining substantially the same strength. It will be understood that while in FIG. 14 only two sets of scissor legs 176 and 178 are shown, any number of scissor legs may be utilized to obtain a desired height.

Figure 10:
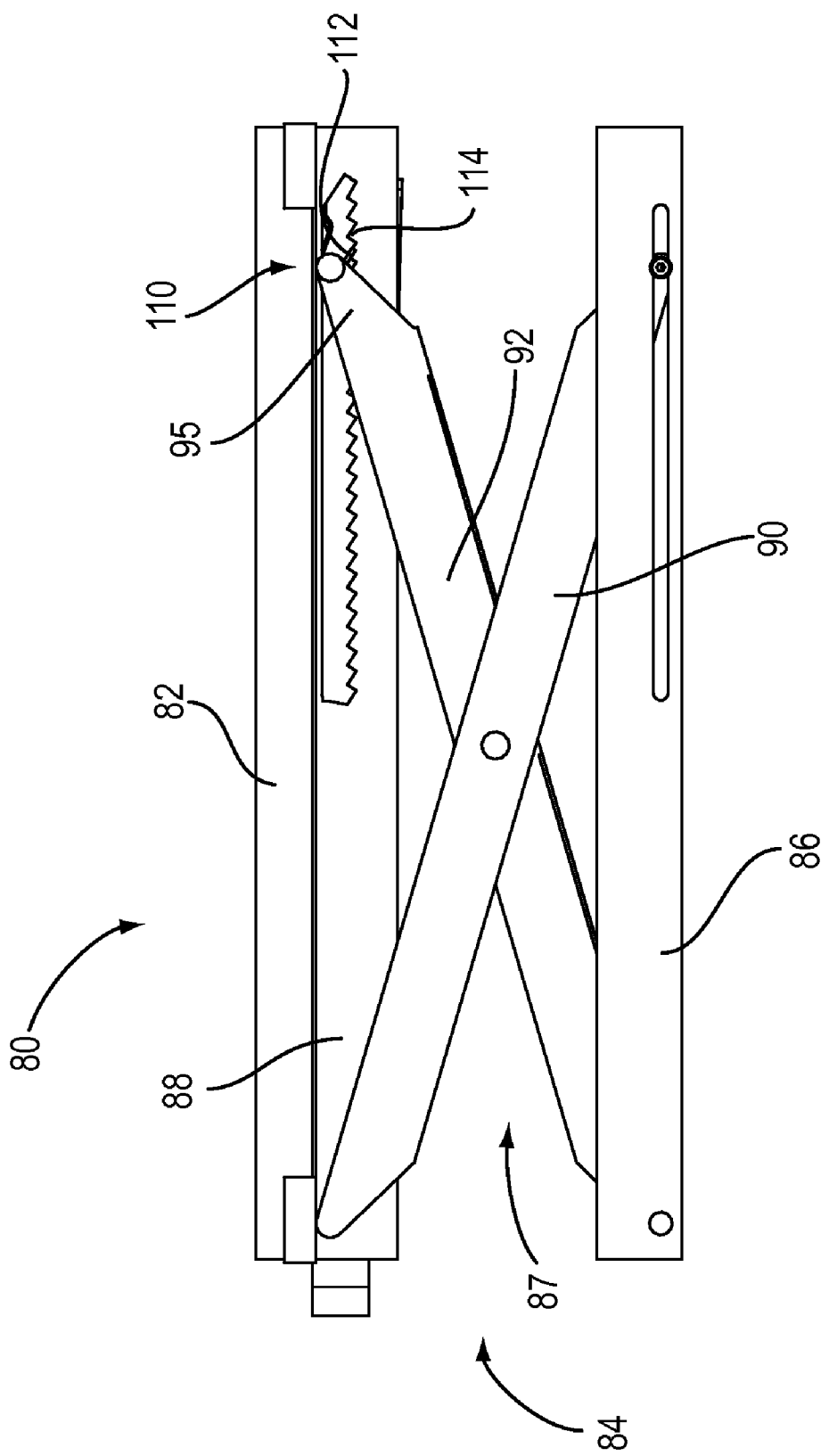
FIG. 10 is side view of an adjustable cutting board with scissor legs in accordance with embodiments of the present invention.
Figure 11:
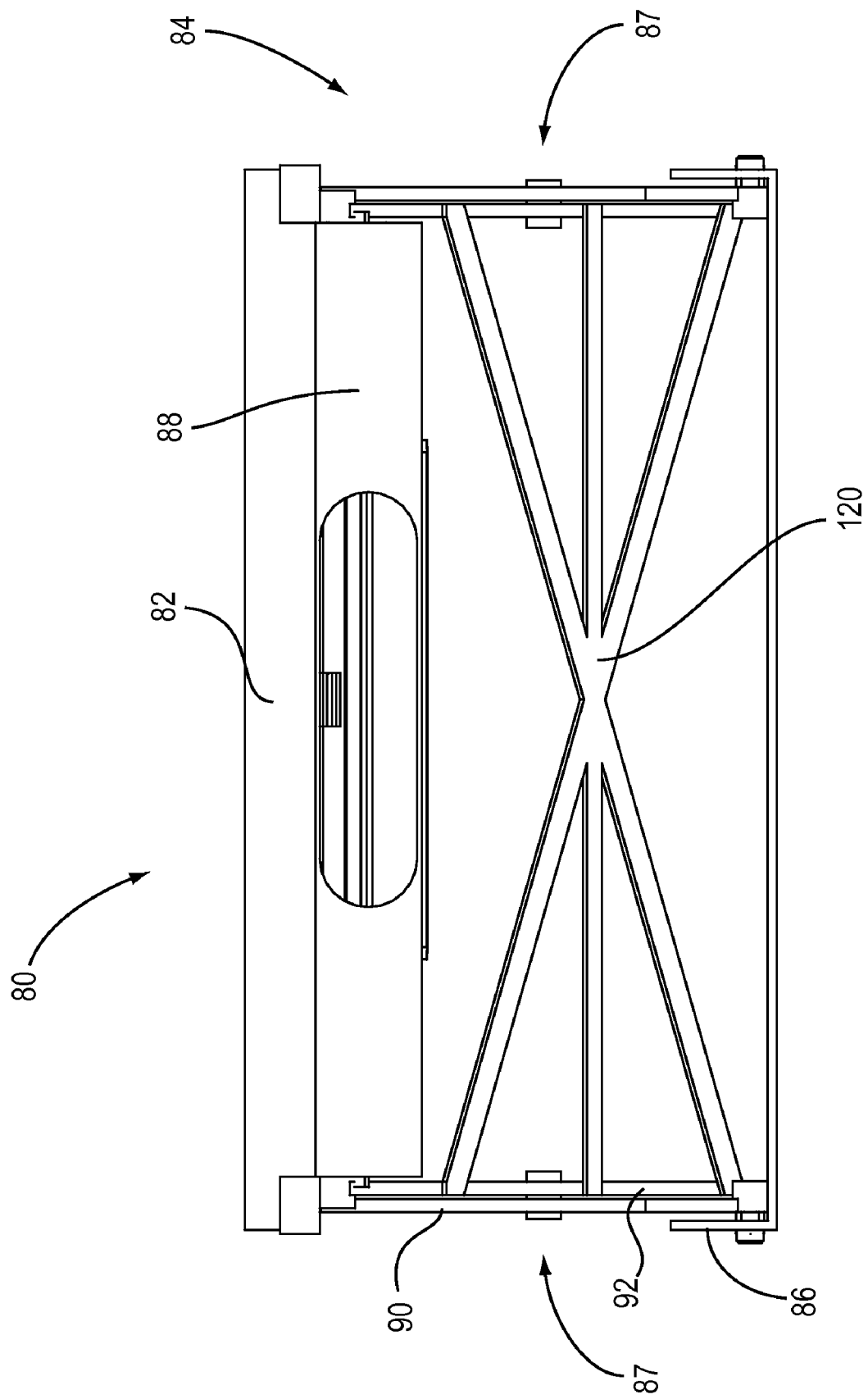
FIG. 11 is an end view of an adjustable cutting board with scissor legs in accordance with embodiments of the present invention.

Referring again to the drawings, FIGS. 10 and 11 depict an adjustable cutting board 80 in accordance with particular embodiments of the present invention. The adjustable cutting board 80 includes a cutting board 82, an adjustable frame 84 and a ratchet mechanism 110. The adjustable frame includes a base 86, a cutting board receiver 88 and scissor legs 87 coupled between the base 86 and the cutting board receiver 88. The scissor legs 87 each have a first portion 90 and a second portion 92 rotatably coupled together. The ratchet mechanism 110 may be for retaining the scissor legs 87 at predetermined heights within a predetermine range of heights. The ratchet mechanism 110 may include a pawl 112 and teeth 114. The pawl 112 of the ratchet mechanism 110 is coupled to second ends 95 of the second portions 92 of the scissor legs 84. The teeth 114 of the ratchet mechanism 110 may be integral with the cutting board receiver 88. The ratchet mechanism 110 further comprises a torsion spring (not shown) coupled to the pawl 112 to automatically engage the pawl 112 with the teeth 114 of the ratchet mechanism 110.

The second portion 92 of each scissor leg 84 may be coupled together by a support structure 120. The support structure 120 adds greater strength to the adjustable frame 84. It will be understood that the scissor legs 87 and the ratchet mechanism 110 have a strength to support at least 120 pounds.

Figure 13A:
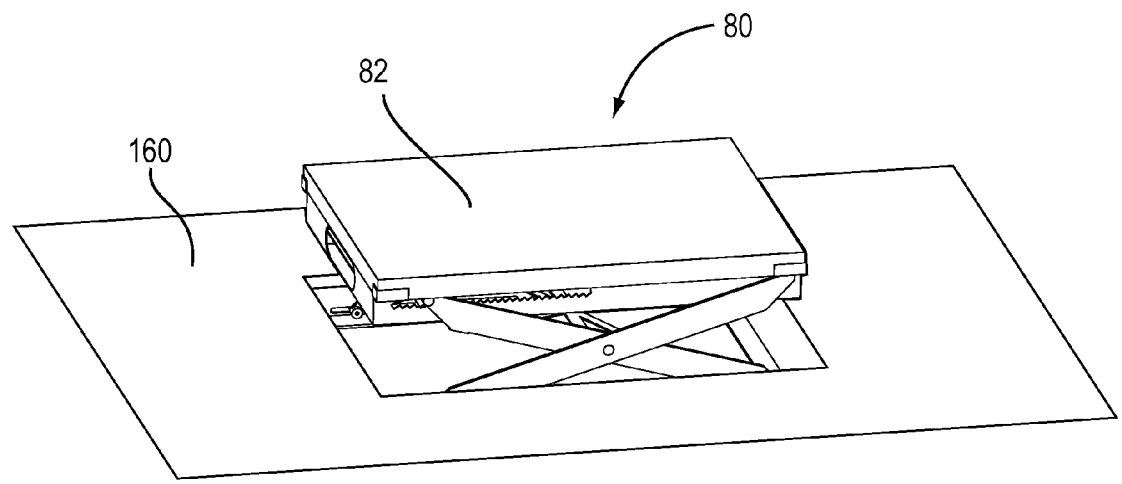
FIGS. 13A-13B are perspective views of an adjustable cutting board that is integral with a working surface in accordance with the present invention.
Figure 13B:
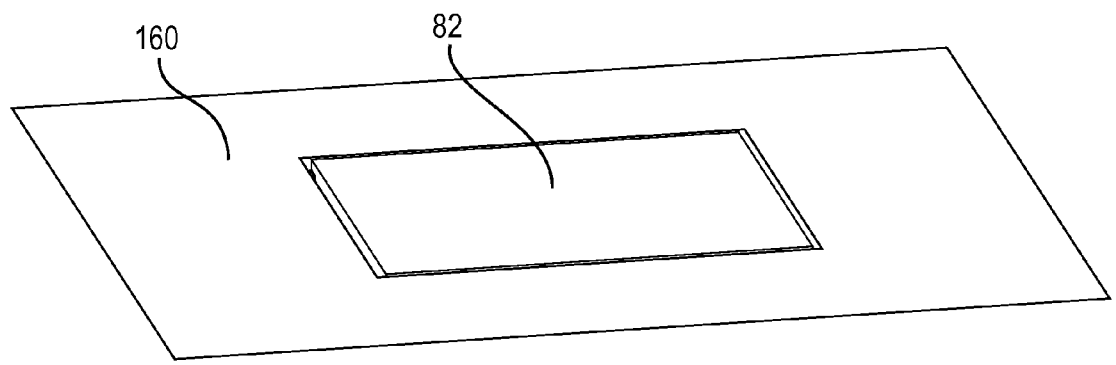

Referring further to the drawings, FIGS. 13A and 13B depict an adjustable cutting board 80 integral with a working surface 160, according to particular embodiments of the present invention. The cutting board 82 of the adjustable cutting board 80 may be raised to a desired height while preparing food on the cutting board 82. When not in use, the adjustable cutting board 80 may be placed in a closed position, wherein the cutting board 82 is within substantially a same plane as the working surface 160.

Figure 12:
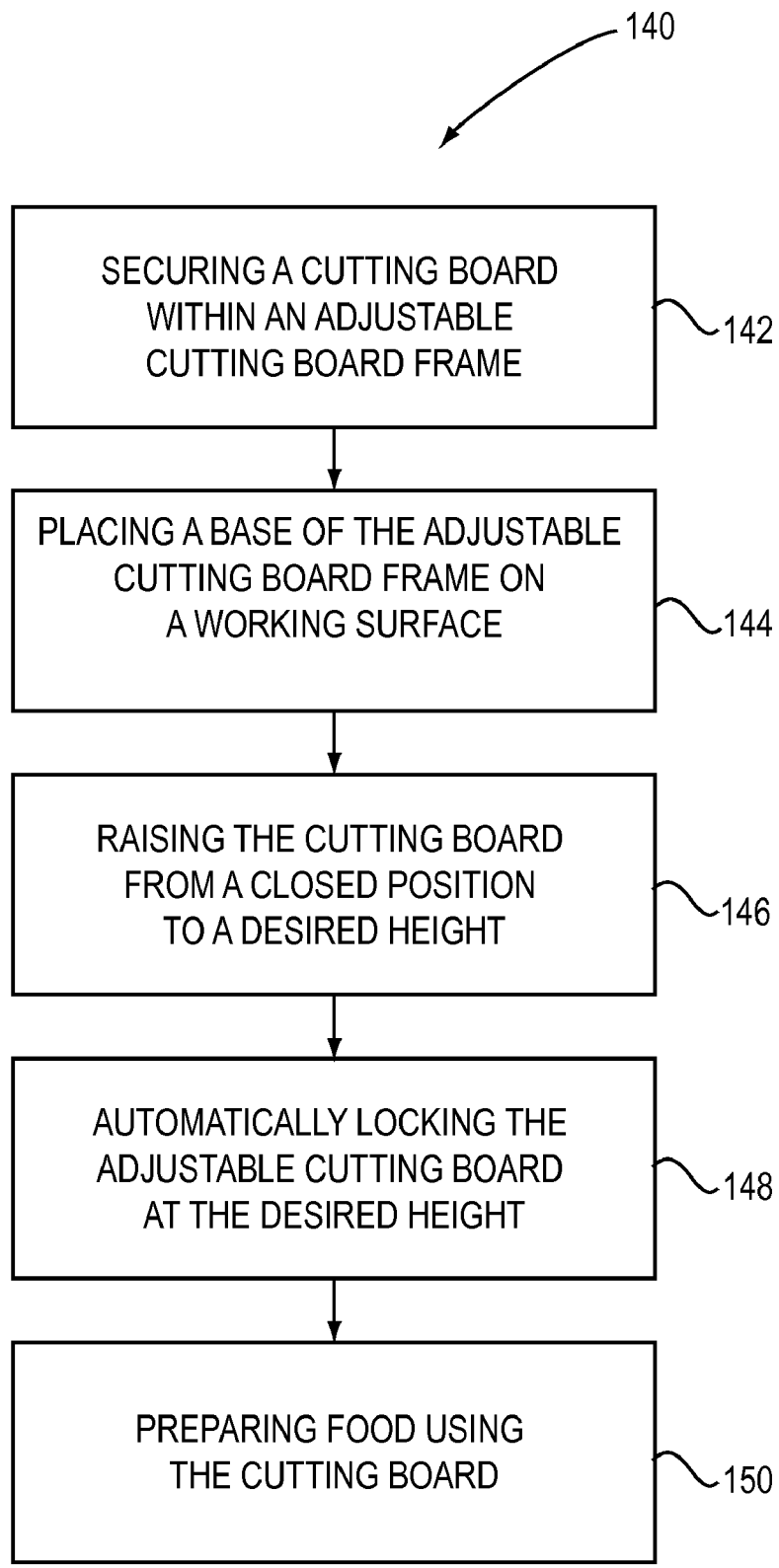
FIG. 12 is a flow chart of a method of use of an adjustable cutting board with scissor legs in accordance with the present invention.

Referring again to the drawings, FIG. 12 depicts a flow chart of a method 140 of using an adjustable cutting board according to particular embodiments of the present invention. The method 140 may include securing a cutting board within an adjustable cutting board frame (Step 142); placing a base of the adjustable cutting board frame on a working surface (Step 144); raising the cutting board from a closed position to a desired height (Step 146); automatically locking the adjustable cutting board at the desired height (Step 148); and preparing food using the cutting board (Step 150).

Particular embodiments of the method 140 may include further step such as, but not limited to, lowering the cutting board to the closed position, removing the cutting board from the adjustable cutting board frame, and cleaning and sanitizing the cutting board.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An adjustable food preparation assembly comprising:
a cutting board; and
an adjustable frame coupled to the cutting board for adjusting a height of the cutting board, the adjustable frame comprising:
 a base;
 a working surface wherein the cutting board is integral with the working surface,
 such that when the cutting board is in a closed position, the cutting board is within a same plane as the working surface;
 a cutting board receiver including corner brackets for receiving said cutting board, said cutting board removably secured in said cutting board receiver; and
 at least two scissors legs, each scissors leg having a first portion and a second portion rotatably coupled together, wherein the scissors legs are coupled between the base and the cutting board receiver.

2. The food preparation device of claim 1, wherein the adjustable frame further comprises a ratchet mechanism for retaining the legs at a predetermined height within a predetermined range of heights.

3. The food preparation device of claim 1, wherein the base of the adjustable frame has at least two support bars coupled between two track portions.

4. The food preparation device of claim 3, wherein the base has two apertures and each aperture is configured to couple to a second end of the first portion of one of the at least two scissors legs, and wherein the aperture has a length that defines a range of heights the frame is adjustable between.

5. The food preparation device of claim 4, wherein the cutting board receiver has two apertures corresponding to the two apertures of the base, wherein each aperture of the cutting board receiver is configured to couple to a second end of the second portion of one of the at least two scissors legs, and wherein each aperture of the cutting board receiver has a length that defines the range of heights the frame is adjustable between.

6. The food preparation device of claim 2, wherein the scissors legs and the ratchet mechanism have a strength to support at least 120 pounds.

7. The food preparation device of claim 6, wherein the cutting board is non-porous, lightweight and planeable.

8. A portable and adjustable food preparation device comprising:
a cutting board;
an adjustable frame comprising a base;
a cutting board receiver including corner brackets for receiving said cutting board, said cutting board removably secured in said cutting board receiver;
two scissor legs, each leg having a first and second portion rotatably coupled together, wherein a first end of the first portion is rotatably coupled to the cutting board receiver and a second end of the first portion is slidably coupled to the base and wherein a first end of the second portion is rotatably coupled to the base and a second end of the second portion is slidably coupled to the cutting board receiver;
a ratchet mechanism for retaining the legs at a predetermined height within a predetermined range of heights, wherein a pawl of the ratchet mechanism is coupled to the second ends of the second portions of the two scissor legs and teeth of the ratchet mechanism are integral with the cutting board receiver; and
a torsion spring coupled to the pawl of the ratchet mechanism to engage the pawl with the legs of the frame.

9. The food preparation device of claim 8, wherein the base has at least two support bars coupled between two track portions.

10. The food preparation device of claim 8, wherein the base has two apertures, each aperture configured to couple to the second end of the first portion of one of the two scissor legs, wherein each aperture has a length that defines a range of heights the frame is adjustable between.

11. The food preparation device of claim 10, wherein the cutting board receiver has two apertures corresponding to the two apertures of the base, wherein each aperture of the cutting board receiver is configured to couple to the second end of the second portion of one of the two scissor legs, wherein each aperture has a length that defines the range of heights the frame is adjustable between.

12. The food preparation device of claim 8, wherein the scissor legs and the ratchet mechanism have a strength to support at least 120 pounds.

* * * * *

UNITED STATES PATENT AND TRADEMARK OFFICE
CERTIFICATE OF CORRECTION

| | | |
|---|---|---|
| PATENT NO. | : 7,849,789 B1 | Page 1 of 1 |
| APPLICATION NO. | : 11/781839 | |
| DATED | : December 14, 2010 | |
| INVENTOR(S) | : Michael Whelan | |

It is certified that error appears in the above-identified patent and that said Letters Patent is hereby corrected as shown below:

Col. 9-10; lines 64, 1, 4, 9, 17 and 20;

Claims 2-7, "The food preparation device" should read --The food preparation assembly--

Signed and Sealed this
Twenty-second Day of February, 2011

David J. Kappos
*Director of the United States Patent and Trademark Office*